US 7,391,806 B2

(12) United States Patent
Lattard et al.

(10) Patent No.: US 7,391,806 B2
(45) Date of Patent: Jun. 24, 2008

(54) DIGITAL DATA EXCHANGE DEVICE IN A CDMA SYSTEM

(75) Inventors: Didier Lattard, Rencurel (FR); Didier Varreau, Saint-Georges-de-Commiers (FR); Bernard Piaget, Venon (FR); Marc Laugeois, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 848 days.

(21) Appl. No.: 10/450,447

(22) PCT Filed: Dec. 27, 2001

(86) PCT No.: PCT/FR01/04213

§ 371 (c)(1),
(2), (4) Date: Jun. 19, 2003

(87) PCT Pub. No.: WO02/054611

PCT Pub. Date: Jul. 11, 2002

(65) Prior Publication Data

US 2004/0047315 A1 Mar. 11, 2004

(30) Foreign Application Priority Data

Dec. 29, 2000 (FR) .................................. 00 17285

(51) Int. Cl.
*H04L 5/16* (2006.01)
(52) U.S. Cl. ...................... 375/219; 375/222; 375/141; 370/278; 370/320; 370/479; 455/63.1; 455/515; 455/522
(58) Field of Classification Search ................ 375/130, 375/140, 141, 146, 147, 212, 219, 222, 260; 370/277, 278, 282, 320, 331, 335, 342, 441, 370/465, 479; 455/33.1, 33.2, 522, 434, 455/63, 67.1, 515
See application file for complete search history.

(56) References Cited

U.S. PATENT DOCUMENTS

| 4,984,247 | A | | 1/1991 | Kaufmann et al. |
| 5,978,412 | A | | 11/1999 | Takai |
| 6,005,854 | A | * | 12/1999 | Xu et al. .................... 370/335 |
| 6,094,576 | A | * | 7/2000 | Hakkinen et al. ......... 455/422.1 |
| 6,097,714 | A | | 8/2000 | Fukumasa et al. |

(Continued)

OTHER PUBLICATIONS

Mohsen Kavehrad et al.: "Direct-sequence spread spectrum with DPSK modulation and diversity for indoor wireless communications" IEEE Transactions on Communications, vol. COM-35, No. 2, pp. 224-236, Feb. 1987.

(Continued)

*Primary Examiner*—Dac V Ha
(74) *Attorney, Agent, or Firm*—Connolly Bove Lodge & Hutz LLP

(57) ABSTRACT

The invention relates to a device for exchanging digital data between several sources and at least one hub in a CDMA system, characterized in that it comprises a number n of digital transmission/reception circuits (1) installed in parallel, each circuit (1) comprising a transmitter (2$_i$) comprising means of generating an integer number N$_c$ of codes that will be used for spectral spreading of data to be transmitted and a receiver (4$_i$) comprising means (46, 48) of detecting the access of new sources to the CDMA system transmission channel and means (49) of generating synchronization signals and power control signals corresponding to each detected new source.

11 Claims, 2 Drawing Sheets

U.S. PATENT DOCUMENTS 6,542,493 B1 * 4/2003 Moerder .................... 370/342
6,674,788 B2 * 1/2004 Lomp et al. ................ 375/130
6,963,753 B1 * 11/2005 Hamabe .................... 455/522

OTHER PUBLICATIONS

Marvin K. Simon et al. Spread Spectrum Communications, vol. 1 1985.

* cited by examiner

DIGITAL DATA EXCHANGE DEVICE IN A CDMA SYSTEM

TECHNICAL FIELD

The invention relates to a device for exchanging digital data between several sources and at least one hub in a synchronous or quasi-synchronous CDMA (Code Division Multiple Access) system.

A synchronous CDMA system is composed of a set of transmitters usually called "modems", and a receiver, usually called a "hub". The information is transmitted from the modems to the hub through an uplink channel and the information is transmitted from the hub to the modems through a downlink channel. Several modems can start a transmission simultaneously. To make the link synchronous, information about each modem transmitted through the uplink channel must reach the hub in a synchronised manner.

During the transmission phase, one or several codes are allocated to each modem so that they transmit its information at a speed compatible with its demand. The codes used must be orthogonal with each other such that inter-correlation noise is null when the codes are synchronised. On reception, the hub decodes the received signal using the same codes as the modems in order to extract useful binary information from the signal.

Synchronous reception of sent codes requires the use of a clock indicating the transmission frequency of binary symbols making up the information to be transmitted. This clock must be adjusted to a predetermined reference clock. Synchronisation of the various modems then consists of determining the offset between each transmitted code and the reference clock and adjusting the symbol clock to the reference clock.

The direct sequence spectrum spreading modulation technique is well described in the specialised literature. For example, the following books provide information about this technique:

"*CDMA Principles of Spread Spectrum Communication*" by Andrew J. VITERBI, Addison-Wesley Wireless Communications Series;

"*Spread Spectrum Communication*" by Marvin K. SIMON et al., vol. I, 1983, Computer Science Press;

"*Spread Spectrum System*", R. C Dixon, John WILEY and Sons.

This technique is also described in some articles:

"*Direct-Sequence Spread Spectrum with DPSK Modulation and Diversity for Indoor Wireless Communication*", published by Mohsen KAVEHARAD and Bhashkar RAMAMURTHI, in the "*IEEE Transactions*" journal, vol. Com 35, No. 2, February 1987.

There are many advantages of the direct sequence spectrum spreading technique. Following are some examples of these advantages:

discretion: the discretion is related to spreading of information transmitted on a wide frequency band; the result is a low spectral density of the transmitted power;

multiple access: several direct sequence spectrum spreading connections may share the same frequency band using orthogonal pseudo-random spreading sequences (codes with an inter-correlation function that has very low residual noise for all offsets);

good cohabitation with conventional narrow band communications; the same frequency band may be shared by systems using a narrow band modulation and systems using a wide band modulation; narrow band communications only experience a small increase in the ambient radioelectric noise, which is particularly weak when the length of the sequence is greater; spectrum spreading modulations reject narrow band modulations due to the correlation operation carried out on reception;

difficulty of interception: direct sequence spectrum spreading transmission is difficult to intercept due to the low spectral density and due to the fact that the receiver must know the spreading sequence in order to be able to demodulate the data;

excellent behaviour in a multi-path environment: in this type of environment, the radioelectric wave is propagated along multiple paths that involve reflection, diffraction and diffusion phenomena; moreover, it is not unusual if there is no longer a direct path stable in time between the transmitter and the receiver; this propagation along multiple paths induces parasite effects that tend to degrade the transmission quality.

A large number of spreading codes are necessary, in order to obtain good flexibility in code allocation and a good robustness of the transmission system with regard to pulse noise.

STATE OF THE ART

CDMA devices available on the market at the present time are incapable of generating a large number of spreading codes, and the design of a circuit capable of overcoming this limitation is expensive and there are technical problems in manufacturing it. The processing to be done by the hub is complex and requires a large number of operators, the number of which is proportional to the number of codes generated and the length of each code. Furthermore, an increase in the number of transmitters operating simultaneously requires greater synchronisation precision due to the increase in intercorrelation noise.

Some examples of components according to prior art are:
the HFA 3860 component made by the Harris Company;
the SC2001 component made by the Sirius Communications Company.

The HFA 3860 circuit is essentially oriented towards a point-to-point link and does not comprise any specific resources to manage a link in a synchronous CDMA system.

The SC2001 system can only process two codes simultaneously. Furthermore, this circuit does not have any resource for management of symbol clocks, for estimating the transmission channel, demodulating received codes, or calculating clock offset set values.

One purpose of the invention is to overcome the disadvantages mentioned above by means of a device with an architecture that enables the use of a large number of spreading codes without affecting the speed of processing.

These purposes are achieved using a device comprising n digital transmission/reception circuits installed in parallel, each circuit comprising a transmitter comprising means for generating an integer number $N_c$ of codes that will be used for spectral spreading of data to be transmitted and a receiver comprising means of detecting the access of new sources to the CDMA system transmission channel and means of generating synchronisation signals and power control signals corresponding to each detected new source.

According to the invention, each receiver comprises an input stage, an acquisition management stage and a traffic management stage, the said input stage receiving a clock signal rx_ck with frequency f and outputting this clock signal rx-ck to the traffic management stage and the clock signal (rx_ck/n) with frequency f/n to the acquisition management stage such that each acquisition management stage processes one among n samples of received data.

According to the invention, the device also comprises a switching circuit to orient one among n data to be transmitted to each transmitter, an adder circuit for adding signals at the output of the said transmitters before transmission, a first calculation circuit for analysing signals output from the acquisition management stages to determine power and clock offset information, a second calculation circuit for analysing signals output from the traffic management module to determine received binary data and clock offset information.

According to the invention, each input stage comprises a received signals shaping module, a pulse filter for limiting the received signals spectrum and a filtered signals sampling module.

According to the invention, each transmitter comprises a first module for generating binary spreading codes and a second module for generating at least one internal clock signal to synchronise reception of symbols transmitted by a source.

According to the invention, each acquisition management stage comprises a first differential demodulation module, a module generating an acquisition signal representative of synchronisation signals and power control signals corresponding to each new transmission source, a generated acquisition signal processing module and a first clock management module.

According to the invention, each traffic management stage comprises a module for correlating previously processed data with codes associated with these data, a module for differential demodulation of correlated data, a calculation module that will determine synchronisation signals and power control signals corresponding to each detected new transmission source.

According to the invention, the number n of transmission/reception circuits is equal to four and the first module generating spreading codes is programmed to generate 32 (thirty-two) spreading codes each comprising 128 pulses with duration $T_c$.

According to the invention, each acquisition management module processes a spreading code with 128 pulses.

According to the invention, the device comprises a display module.

Other characteristics and advantages of the invention will become clearer after reading the following description given as a non-limitative example with reference to the attached figures, in which:

FIG. 1 shows a preferred embodiment of the invention in which a device in a CDMA system for a digital data exchange between several sources and at least one hub comprises four digital transmission/reception circuits 1 installed in parallel, each circuit 1 comprising a transmitter $2_i$ and a receiver $4_i$.

Figure 2:
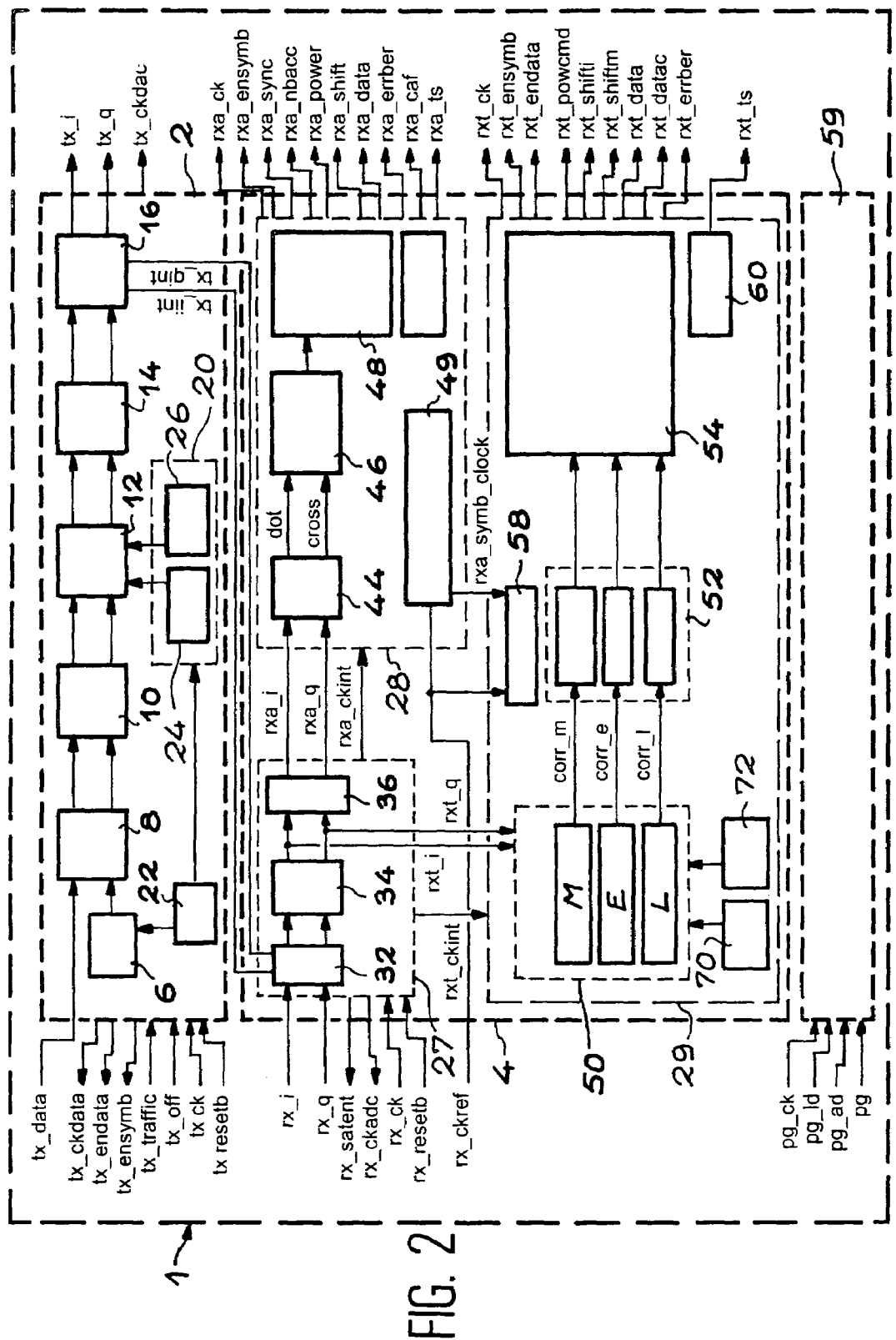
FIG. 2 shows a block diagram of a transmission/reception circuit integrated into the device shown in FIG. 1.

With reference to FIG. 2, each transmitter $2_i$ comprises a data input module 6 installed in cascade with a data parallelisation block 8, a differential modulation block 10, a spreading block 12, a summation block 14 and a first pulse filter 16.

A first module 20 supplies thirty-two binary codes to the spreading block 12 to spread the symbols to be transmitted, and a second module 22 generates an internal clock signal. The first module 20 comprises a table 24 comprising several codes and a code allocation mask 26 that selects codes used at the transmitter 2. The binary throughput of the transmitter 2 is directly related to the number of codes validated in the mask 26.

The receiver 4 comprises an input stage 27, an acquisition management stage 28 and a traffic management stage 29.

Figure 1:
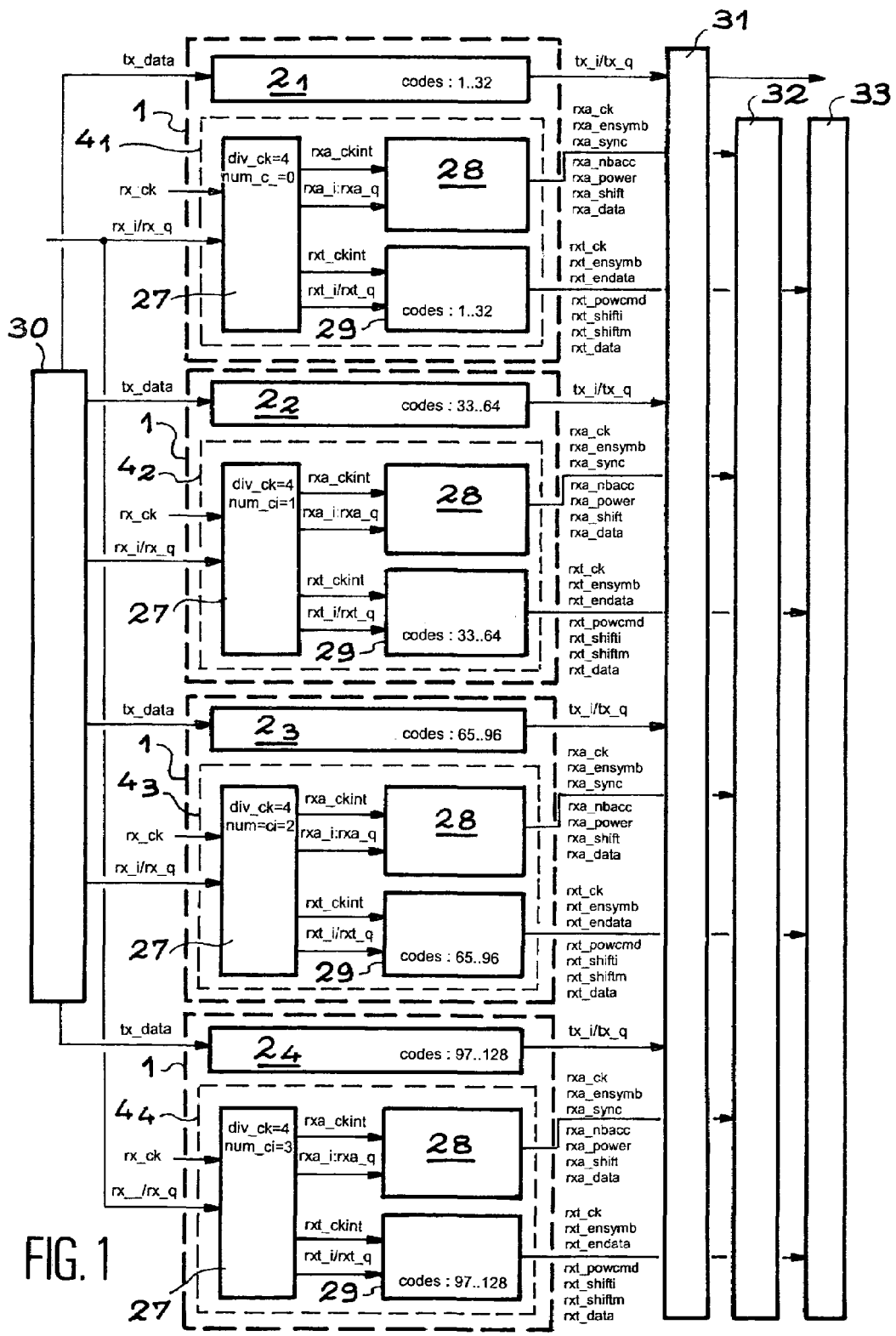
FIG. 1 shows a general layout of the device according to the invention.

To achieve parallelisation, a switching circuit 30 (FIG. 1) routes one among n data to be transmitted to each transmitter $2_i$, and the signals at the output from the said transmitters $2_i$ are added in an adder circuit 31 before being transmitted, a first calculation circuit 32 analyses the signals at the output from the acquisition management stages to determine power and clock offset information, and a second calculation circuit 33 analyses signals at the output from the traffic management module 29 to determine the received binary data and clock offset information.

The input stage 27 (FIG. 2) comprises a received signals shaping block 32, a pulse filter 34 that is designed to limit the received signals spectrum, and a sampling stage 36 of filtered signals. This input stage 27 transmits firstly base band data that have already been processed (rxa_i, rxa_q) to the acquisition management stage 28, that extracts power and time offset information for the received symbols with respect to the base clock (rx_ckref) of the receiver 4 from these data, and secondly data (rxt_i, rxt_q) at the traffic management stage 29 that extracts transmitted binary data and power and time offset information for received symbols with respect to the base clock (rx_ckref) of the receiver 4, from these data.

The input stage 27 receives a clock signal rx-ck with frequency f and outputs this clock signal rx_ck to the traffic management stage 28, and the clock signal (rx_ck/n) with frequency f/4 to the acquisition management stage 28. Thus, each acquisition management stage 28 processes one data sample out of every four received data.

The acquisition management stage 28 comprises a first differential demodulation module 44, an acquisition signal generation module 46, and a generated signal processing module 48. The processing done by module 48 detects access of new sources to the transmission channel and generates synchronisation signals and power control signals corresponding to each new detected source. A new local symbol clock management block 49 is used to adjust detected new transmission sources to the base clock of the receiver 4 (rx_ckref).

The traffic management stage 29 comprises a correlation stage 50 comprising a first channel M, a second channel E and a third channel L. The M, E and L channels transmit correlated data corr_m, corr_e and corr_l respectively, to a second differential demodulation stage 52 that transmits the demodulated data to a calculation stage 54 that determines synchronisation signals and power control signals corresponding to each detected new transmission source. A second clock management block 58 retrieves the clock signal generated by the first clock management block 49.

A programming module 59 accessible through a simple interface comprising an address bus and a data bus is used to program operating parameters of transmitters $2_i$ and receivers $4_i$.

In the embodiment illustrated in FIG. 2, the correlation stage 50 comprises a bench of thirty-two sliding correlators that makes correlations between base band information after formatting rx_i and rxt_q and traffic sequences supplied by a codes table 70 and a masking module 72. The maximum length of correlation sequences is 128 chips.

Each transmitter 2i can be programmed either in ACQUISITION mode or in TRAFFIC mode, and receivers 4i manage current communications and new accesses in parallel.

Four modulation formats may be used during the transmission, namely BPSK (Binary Phase Shift Keying) DBPSK (Differential Binary Phase Shift Keying), SPSK (Quaternary Phase Shift Keying), and DQPS (Differential Quaternary Phase Shift Keying). The BPSK and QPSK modulations are accessible by programming. In QPSK, two useful bits are transmitted per symbol and per code, which means that incoming data need to be grouped in packets of two "I" and "Q" bits. In BPSK, a single useful bit is transmitted per symbol and per code. Incoming data are copied to I and Q, therefore everything in the rest of the transmission sequence takes place as if QPSK modulation was used.

The base PSK modulation can be transformed into DPSK modulation by a differential encoding process by simple programming. Binary data grouped into symbols of two bits are coded differentially according to the IEEE 802.11 and DVB standards.

FIG. 2 shows input and output data related to the transmitter 2:
- With the exterior:
    - tx_ck: transmitter 2 base clock;
    - tx_resetb: initialisation command;
    - tx_off: interrupt transmission command;
    - tx_traffic: traffic or acquisition mode command;
    - tx_data: input binary data;
    - tx_ensymb: validate symbols command;
    - tx_endata: validate data command;
    - tx_ckdac: sampling clock for analogue-digital converters;
    - tx_i: channel I transmitter output;
    - tx_q: channel Q transmitter output;
- With the receiver 4 input stage:
    - tx_iint: internal loop back from channel I transmitter output;
    - tx_iint: internal loop back from channel Q transmitter output.

On reception, the input stage 27 shapes the base band signals and transmits them to the acquisition stage 28 and to the traffic stage 29.

The base functions of the input stage 27 are:
- clock management;
- generation of clocks for the acquisition management stage 28 and-the traffic management stage 29;
- shaping of base band signals;
- filtering of pulses;
- sampling of filtered signals and transfer the sampled signals and the clock signals to acquisition management stage 28 and the traffic management stage 29.

The inputs and outputs for this stage are:
- With the exterior
    - rx_ck: receiver base clock 4;
    - rx_resetb: reset to zero for initialisation;
    - rx_i: the channel I receiver 4 input;
    - rxq: the channel Q receiver 4 input;
    - rx_ckadc: sample clock for analogue digital converters;
    - rx_satent: saturation in shaping of input data.
- With transmitter 2
    - tx_iint: internal loop back of the output from the transmitter 2 channel I;
    - txqint: internal loop back of the output from the transmitter 2 channel Q;
- With acquisition stage 28
    - rxa_ckint: acquisition stage base clock 28;
    - rxa_i: base band information for channel I;
    - rxa_q: base band information for channel Q.
- With the traffic management stage 29
    - rx_ckint: base clock for the traffic management stage 29;
    - rxt_i: base band information for channel I;
    - rx_tq: base band information for channel Q.

During operation, each transmitter $2_i$ is programmed to generate thirty-two spreading codes, different from the codes of the other transmitters. The maximum duration of the generated codes is equal to 128 times the duration of a chip. Since a chip is in a binary state, it will be equal to "0" or "1" for the elementary duration $T_c$. The binary data to be coded with successive sequences of thirty-two generated codes are presented at the inputs of the first transmitter $2_1$, the second transmitter $2_2$, the third transmitter $2_3$ and the fourth transmitter $2_4$ respectively.

The input stage 27 divides the reference clock frequency rx_ref by four and outputs a clock signal rx_ref/4 with frequency f/4, to transmitters $2_1$ to $2_4$. This division function is done by programming the frequency f and the number n. A number is assigned to each circuit 1 so that data can be switched by the switching circuit 30.

Oversampling of the signal received at the input stage 27 enables each circuit 1 to process a 128-chip long spreading code with eight samples per chip. The circuit that sends the highest power information value necessarily processes the most central sample in the chip. The resulting clock offset is used to adjust the corresponding transmitter, the clock division factor and the circuit number are integrated in the offset calculation such that the transmitter can use the offset set value produced directly. Each acquisition management circuit comprises a programmable circuit to search for the maximum on the four power data produced by the four circuits 1.

The invention claimed is:

1. A device for exchanging digital data between several sources and at least one hub in a CDMA system, the device comprising n digital transmission/reception circuits connected in parallel, where n is greater than one, each circuit comprising a transmitter comprising means adapted to generate an integer number $N_c$ of codes for use in spectral spreading of data to be transmitted and a receiver comprising means adapted to detect the access of new sources to the CDMA system transmission channel and means adapted to generate synchronisation signals and power control signals corresponding to each detected new source and to provide said synchronisation and power control signals to the transmitter, wherein said transmitter is to adjust at least one transmit parameter based on said synchronisation and power control signals.

2. The device according to claim 1, wherein each receiver comprises an input stage, an acquisition management stage and a traffic management stage, the said input stage adapted for receiving a base clock signal rx_ck with frequency f and outputting this clock signal rx-ck to the traffic management stage and the clock signal with frequency f/n to the acquisition management stage such that each acquisition management stage is adapted to process one among n samples of received data.

3. The device according to claim 2, further comprising a switching circuit to orient one among n data to be transmitted to a transmitter, an adder circuit adapted to add signals at the output of the said transmitters before transmission, a first calculation circuit adapted to analyze signals output from the acquisition management stages to determine power and clock offset information, a second calculation circuit adapted to analyze signals output from the traffic management module to determine received binary data and clock offset information.

4. The device according to claim 3, wherein each acquisition management stage comprises a first differential demodulation module, a module to generate an acquisition signal representative of synchronisation signals and power control signals corresponding to each new transmission source, a generated acquisition signal processing module and a first clock management module.

5. The device according to claim 3, wherein each traffic management stage comprises a module adapted to correlate previously processed data with codes associated with these data, a second module to differentially demodulate the correlated data, and a calculation module adapted to determine synchronisation signals and power control signals corresponding to each detected new transmission source.

6. The device according to claim 1, wherein each receiver comprises an input stage, and wherein each input stage comprises a received signals shaping modules a pulse filter adapted to limit the received signals spectrum, and a filtered signals sampling module.

7. The device according to claim 1, wherein each transmitter comprises a first module adapted to generate binary spreading codes $N_c$ and a second module adapted to generate at least one internal clock signal to synchronise reception of symbols transmitted by a source.

8. The device according to claim 7, wherein the number n of transmission/reception circuits is equal to four and the number $N_c$ of spreading codes is equal to 32.

9. The device according to claim 8, wherein each spreading code comprises 128 pulses.

10. A method for exchanging data between sources and at least one hub in a CDMA system, said method comprising:
generating n groups of codes adapted for spectral spreading data for transmission, both n and $N_c$ being integer numbers, each group including $N_c$ codes different from the $N_c$ codes in any other group; and
generating at least one synchronization signal and at least one power control signal for at least one source accessing a transmission channel of said CDMA system, said generating including:
generating a base clock signal having a frequency f;
generating a second clock signal having a frequency f/n;
extracting power and clock offset information from one out of every n received data in response to at least the second clock signal; and
extracting binary data and additional clock offset information from received data in response to at least the base clock signal.

11. The method of claim 10, further comprising routing data for transmission to each one of the n groups of codes and adding n spectrally spread signals together for transmission in the CDMA system.

* * * * *